Jan. 21, 1941.  S. J. NORDSTROM  2,229,120
PLUG VALVE
Filed June 23, 1937
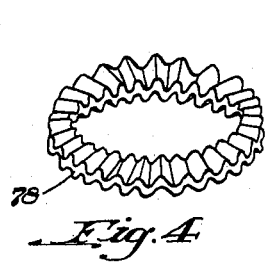
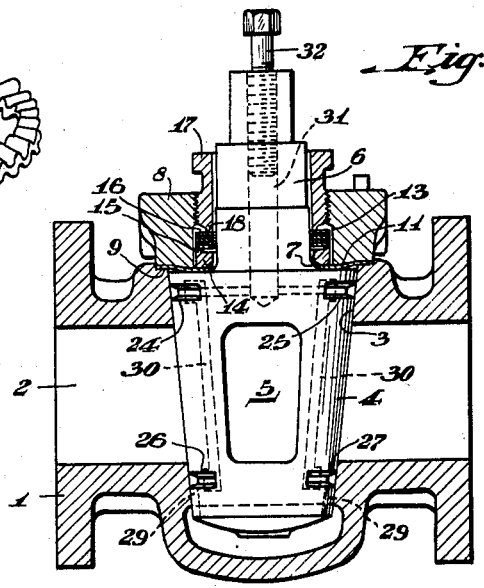
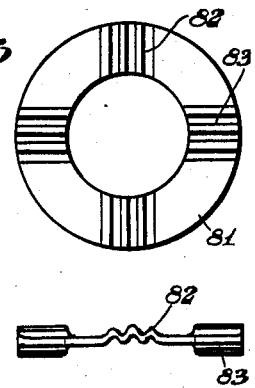
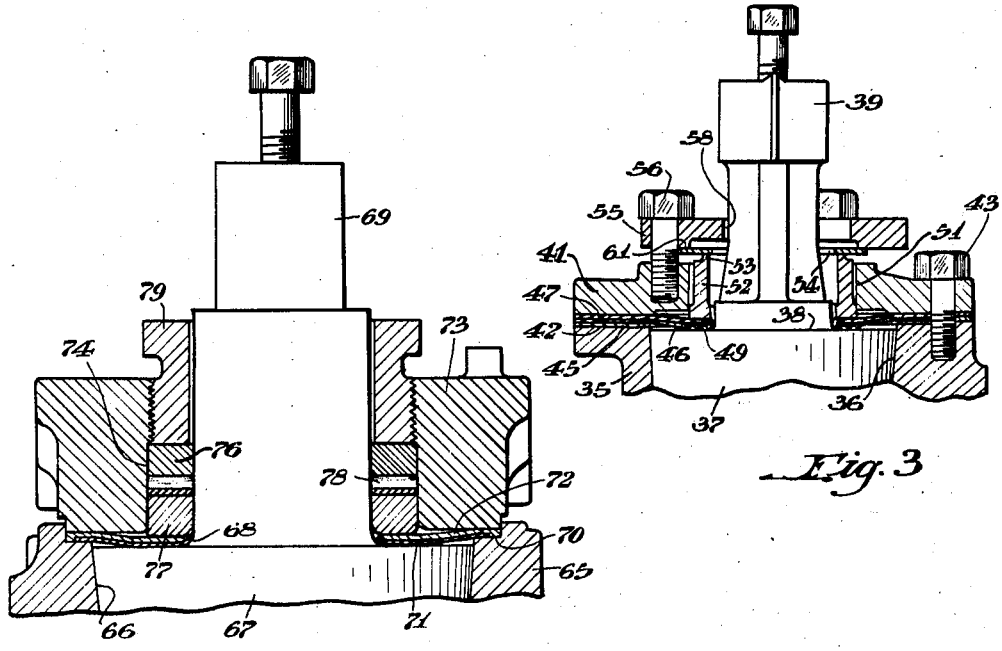
INVENTOR.
Sven J. Nordstrom.
BY Lewis D. Konigsford
ATTORNEY.

Patented Jan. 21, 1941

2,229,120

UNITED STATES PATENT OFFICE 2,229,120

PLUG VALVE

Sven J. Nordstrom, Lafayette, Calif., assignor to Merco Nordstrom Valve Company, Pittsburgh, Pa., a corporation of Delaware Application June 23, 1937, Serial No. 149,870

4 Claims. (Cl. 251—112)

The present invention relates to valves, and more particularly relates to plug valves having means for resiliently maintaining the plug on its seat and wherein means are provided for jacking the plug off its seat by the application of lubricant under pressure.

In plug valves, particularly those having the operating stem at the larger end of the plug, considerable difficulty has heretofore been experienced in maintaining the plug resiliently seated over long periods of time. Fibrous packing material such as asbestos packing or the like have proven satisfactory for only relatively short periods of time, as the packing becomes permanently compressed after long periods of use or when subjected to high temperatures, and consequently loses its resiliency.

It is an object of the present invention to provide a resilient seating member for a plug valve which maintains its resiliency over long periods of time, and is practically unaffected by high temperatures.

A further object is the provision of combined resilient packing and seating means in a plug valve which eliminates the need for ordinary stuffing boxes or the like.

In accordance with the present invention, I provide in a plug valve a washer or plate so constructed and supported that it may be deflected by a suitable adjusting member, and because of the inherent resilience of the washer the deflecting force is resiliently transmitted to the plug to maintain the plug resiliently on its seat. The deflecting force also may be utilized to seal the valve stem of the plug by providing a suitable flexible metal diaphragm bearing on a shoulder of the plug at its inner periphery and securely clamped in sealing relation to the casing at its outer periphery. The invention is applicable to lubricated or non-lubricated plug valves.

The invention will be described in greater detail in connection with the accompanying drawing wherein:

Figure 1 is a vertical section with the plug in elevation of a preferred embodiment of the invention;

Figure 2 is a fragmentary vertical section showing a modification;

Figure 3 is another fragmentary vertical section showing a further modification;

Figure 4 is a perspective view showing a preferred modification of resilient washer, and Figures 5 and 6 are plan and side elevations respectively of a further modification of a resilient washer.

Referring to the drawing, Figure 1, the numeral 1 designates a valve casing having a passageway 2 extending therethrough for flow of fluid, and a tapered bore 3 extending transversely of the passageway. A tapered plug 4 is seated in the seat 3 and has a port 5 therethrough adapted to register with the passageway 2 in open position of the valve. At its larger end the plug 4 is reduced to provide a stem 6, shoulder 7 being formed substantially at the juncture of the stem and plug, which preferably is rounded. The larger end of the valve seat is closed by a cover 8 which rests on a shoulder 9 on the casing and is bolted or otherwise suitably secured to the casing, and a diaphragm 11 of thin flexible sheet steel or other suitable material is interposed between the cover and shoulder. In the modification shown in Figure 1, the diaphragm 11 extends inwardly substantially to the stem 6 of the plug, and bears on the rounded shoulder 7.

The cover 8 has a bore 13 therethrough to provide a packing chamber, and the packing in this chamber comprises a metal ring 14 which, as shown, bears on the inner periphery of the diaphragm 11 and forces it into sealing engagement with the shoulder 7 of the plug. The metal ring has a rib 15 on its upper surface adjacent its outer periphery, and a plurality of washers 16 are superposed on ring 14 with their outer peripheries resting on said rib, their inner peripheries being spaced from the ring. These washers preferably are flat, although if desired bowed or dished washers may be employed. If desired, only one washer of suitable dimensions may be used. A gland or bushing 17 is threaded into the cover 8 and has a reduced portion or rib 18 bearing on the inner peripheries of washers 16.

The seating surface of the plug and casing is lubricated in any suitable way, the preferred arrangement of lubricating grooves comprising two separated circumferential grooves 24 and 25 at the larger end of the plug above the passageway 2 in the casing, and similar circumferential grooves 26 and 27 at the smaller end of the plug below the passageway 2 connected with the bottom chamber 28 by vertical grooves 29 in the plug. In full open and full closed positions of the valve the arcuate grooves are connected by four longitudinal grooves 30 in the valve seat, so arranged that in turning between open and closed position the exposed longitudinal grooves are disconnected from the source of lubricant pressure. Lubricant is supplied to these grooves from a reservoir 31 in the valve stem from which it is forced under pressure by the lubricant screw 32, and a suitable check valve may be located in this reservoir to prevent reflux of lubricant.

The operation of the apparatus now will be described. With the valve in assembled position, when it is desired to change the seating thrust on the plug, the gland 17 is threaded inwardly, and the reduced edge 18 of the gland which bears on the washers 16 at their inner peripheries tends to bow these washers by forcing their inner peripheries toward the plug. Due to the inherent resilience of these washers a resilient seating reacting thrust is exerted on the metal packing ring 14 which is transmitted through the metal washer 11 to the plug. The washer 11 is held on the seat 9 at its outer periphery by the cover 8 which is suitably bolted to the casing, and the inner periphery of the washer 11 is held in fluid tight relation to the plug shoulder 7 by the resilient thrust of washers 16 transmitted by ring 14. When it is desired to reduce the seating pressure on the plug, the gland 17 is screwed outwardly, the normal or natural resilience of the washers 16 causing them to follow the movement of the gland and straighten out and thus relieve the pressure on the plug. It will be understood that the washers 16 are selected of suitable material and are of suitable thickness so that in flexing under the pressure of gland 17 the elastic limit thereof will not be exceeded. Any desired number of washers 16 of any suitable thickness may be used for this purpose. The resilient seating thrust of the washers allows the plug to be jacked off its seat by the pressure of lubricant applied to the grooves in the plug and seat by the lubricant screw 32. In view of the higher modulus of elasticity of the washer 16 as compared to fibrous resilient packing material, the separation of the plug surface from its seat upon application of lubricant pressure to the valve will be less than when resilient fibrous material is employed to hold the plug on its seat. Also, in view of this smaller separation there is less possibility of lubricant under pressure entering between the washer 11 and the plug shoulder and locking the plug into its seat.

In the modification shown in Figure 3, the casing 35 has a tapered seat 36 therein in which is seated the valve plug 37 which provides a shoulder 38 at its upper end at the juncture of the valve plug and the stem 39. A cover 41 bears on a flat face 42 at the larger end of the valve seat and is secured in position by cap screws 43 or by any other suitable means. A washer 45 of fibre or other suitable material is interposed between the cover 41 and the seat 42, and a metal disk 46 is held between the fibre washer 45 and a fibre disk 47, the metal disk 46 and the fibre disk 47 extending inwardly substantially to the valve stem. The disk 46 is concentrically corrugated adjacent its inner periphery, as indicated at 49. The cover 41 has a bore 51 therein in which is located a metal packing ring or thrust transmitting ring 52, the enlarged lower end thereof resting on the fibre washer 47 adjacent its inner periphery. The outer end of the packing ring 52 preferably is reduced as indicated at 53 to form a bead and provides a seat for the inner end of a resilient metal ring 54. A follower 55 in the form of a metal plate is bolted to the cover 41 by a plurality of cap screws 56 symmetrically disposed, a suitable hole 58 being provided therein to receive the valve stem 39, and has a seat or edge 61 which engages the outer periphery of the washer 54.

From the foregoing description it will be apparent that when the follower plate 55 is bolted down by the bolts 56, it flexes downwardly the outer periphery of the washer 54, and due to the inherent resilience of this washer a resilient thrust is transmitted through the metal packing ring 52 and diaphragms 47 and 46 to the plug shoulder 38, whereby the plug is urged resiliently into its seat. The seating pressure on the plug may be increased by tightening down the stud bolts 56, or may be relieved by loosening the stud bolts 56. The corrugated form of washer 46 reduces the area of contact of this washer with the plug shoulder and thereby reduces friction.

In the modification shown in Figure 2, the casing 65 has a tapered seat 66 therein in which is seated the valve plug 67 which provides a shoulder 68 at its upper end at the juncture of the valve plug and the stem 69. The casing has a shoulder 70 surrounding the larger end of the valve seat, and a metal diaphragm 71 has its outer periphery resting on said shoulder and its inner periphery bears on the shoulder 68 of the valve plug. A washer 72 of asbestos, or similar fibrous material is superposed on the washer 71 and cover 73 of the valve which is secured to the casing by bolts or other suitable securing means clamps the outer peripheries of washers 71 and 72 on the shoulder 70. The cover 73 has a bore 74 therein which receives a packing comprising a lower metal ring 77 bearing on the inner peripheries of washers 71 and 72, and an upper ring 76, an inherent resilient washer 78 being positioned therebetween. A gland 79 is threaded into the bore 74 of the cover, and by threading the gland 79 inwardly the washer 78 is deformed and caused to exert a resilient seating thrust which is transmitted through the lower metal ring or packing 77 and washers 71 and 72 to the plug. The preferred construction of washer 78 is shown in perspective in Figure 4, wherein it will be seen that this washer is crimped so as to be radially corrugated throughout its entire area.

In the modification shown in Figures 5 and 6, a washer 81 is shown which may be used in place of the washer 78. This washer has a series of parallel corrugations 82 formed for only a portion of its surface at right angles to a second similar series of corrugations 83. The central corrugations in these series preferably are somewhat higher than the next adjacent ones, by about five-thousandths of an inch, and so on when more than three corrugations are used. When a compressive force is exerted on this washer the deflection of the washer transmits a resilient seating force to the plug in the same manner as described in connection with the washer 78 in Figure 3.

In the modification shown in Figures 2 and 3 the plug may be jacked from its seat by lubricant pressure in the same manner as described in connection with the modification shown in Figure 1.

In the modifications shown in Figures 1 and 3, the resilient seating washer is supported by what may be called a cantilever support, the seating thrust being exerted by reason of the bowing or deformation of the resilient washer. In Figures 2, 4, 5 and 6 the washer is initially deformed by crimping so that when compressed it is deformed and thus exerts a resilient seating force on the plug. As the invention may be embodied in other specific forms without departing from the spirit or essential characteristics thereof, the present preferred embodiment is therefore to be considered as illustrative rather than restrictive of the invention.

What is claimed and desired to be secured by United States Letters Patent is:

1. A valve assembly comprising a casing having a passageway therethrough for flow of fluid; a valve seat in said passageway and a plug valve element movably mounted in said seat; means including a plurality of communicating grooves on said valve element for introducing lubricant under pressure within said casing for jacking said valve element off its seat; a stem projecting from said valve exteriorly of said casing and a shoulder on said valve element surrounding the base of said stem; and thrust means resiliently bearing on said shoulder for urging said valve element toward its seat and opposing the force of said lubricant pressure, said thrust means comprising an annular substantially radially corrugated metal washer surrounding said stem and an adjustable collar on said casing surrounding said stem for deforming said washer and maintaining it in deformed energized condition in said assembly.

2. In the valve assembly defined in claim 1, said washer having a plurality of circumferentially spaced sets of corrugations.

3. In the valve assembly defined in claim 1, certain of said corrugations of said washer being higher than the corrugations adjacent thereto.

4. In the valve assembly defined in claim 1, said washer having a plurality of circumferentially spaced sets of corrugations with at least one corrugation in each set being higher than the adjacent corrugations in said set.

SVEN J. NORDSTROM.